United States Patent
Clark

(10) Patent No.: US 7,763,789 B2
(45) Date of Patent: Jul. 27, 2010

(54) MUSICAL INSTRUMENT TUNER

(76) Inventor: James Hastings Clark, 89 St Neots Road, Eaton Ford, St. Neots, Cambridgeshire PE19 7AL (GB)

(*) Notice: Subject to any disclaimer, the term of this patent is extended or adjusted under 35 U.S.C. 154(b) by 0 days.

(21) Appl. No.: 12/019,288

(22) Filed: Jan. 24, 2008

(65) Prior Publication Data
US 2008/0229907 A1  Sep. 25, 2008

(51) Int. Cl.
G10G 7/02 (2006.01)

(52) U.S. Cl. ............... 84/454; 84/458; 84/616; 84/654

(58) Field of Classification Search ............ 84/454, 84/455, 458, 724, 616, 654, 681
See application file for complete search history.

(56) References Cited

U.S. PATENT DOCUMENTS

| | | | | |
|---|---|---|---|---|
| 3,795,169 A * | 3/1974 | Belcher | | 84/454 |
| 3,901,120 A * | 8/1975 | Youngquist | | 84/454 |
| 4,023,462 A * | 5/1977 | Denov et al. | | 84/454 |
| 4,271,746 A * | 6/1981 | Dobbie | | 84/454 |
| 4,297,938 A * | 11/1981 | Kirby | | 84/455 |
| 4,320,689 A * | 3/1982 | Pogoda | | 84/454 |
| 4,321,463 A * | 3/1982 | Stecher | | 250/227.19 |
| 4,327,623 A * | 5/1982 | Mochida et al. | | 84/454 |
| 4,592,262 A * | 6/1986 | Yang | | 84/115 |
| 4,741,242 A * | 5/1988 | Aronstein | | 84/454 |
| 5,065,660 A * | 11/1991 | de Buda | | 84/200 |
| 5,227,575 A * | 7/1993 | Mishima | | 84/670 |
| 5,343,793 A * | 9/1994 | Pattie | | 84/454 |
| 5,388,496 A * | 2/1995 | Miller et al. | | 84/454 |
| 5,549,028 A * | 8/1996 | Steinberger | | 84/454 |
| 5,877,443 A * | 3/1999 | Arends et al. | | 84/454 |
| 5,959,229 A * | 9/1999 | Walley | | 84/454 |
| 6,580,024 B2 * | 6/2003 | Skubic | | 84/477 R |
| 6,812,392 B2 * | 11/2004 | Brando | | 84/411 R |
| 7,285,710 B1 * | 10/2007 | Wallace | | 84/454 |
| 7,411,124 B2 * | 8/2008 | Muramatsu | | 84/615 |
| 2001/0035084 A1 * | 11/2001 | Kulas | | 84/290 |
| 2002/0184992 A1 * | 12/2002 | Brando | | 84/411 R |
| 2005/0087060 A1 * | 4/2005 | Taku et al. | | 84/455 |
| 2005/0204897 A1 * | 9/2005 | Adams et al. | | 84/454 |
| 2005/0204898 A1 * | 9/2005 | Adams et al. | | 84/454 |
| 2005/0262988 A1 * | 12/2005 | Yurkovsky | | 84/455 |
| 2006/0162534 A1 * | 7/2006 | Muramatsu | | 84/724 |
| 2007/0028746 A1 * | 2/2007 | Herring | | 84/322 |
| 2007/0214935 A1 * | 9/2007 | Lyles et al. | | 84/313 |
| 2008/0196571 A1 * | 8/2008 | Lyles | | 84/299 |
| 2008/0229905 A1 * | 9/2008 | Lau et al. | | 84/454 |
| 2008/0229907 A1 * | 9/2008 | Clark | | 84/454 |
| 2008/0282873 A1 * | 11/2008 | Kotton et al. | | 84/645 |

* cited by examiner

*Primary Examiner*—David S. Warren

(57) ABSTRACT

The present invention relates to musical instrument tuners, more particularly to a tuner for providing tuning information regarding a musical instrument without making physical or electrical contact with the instrument. We describe a musical instrument tuner for providing tuning information for tuning a musical instrument, said musical instrument having a vibrating element, the tuner comprising: a light source for emitting light onto the said vibrating element; a light detector for detecting reflected light; an amplifier coupled to said light detector for amplifying a signal from said light detector; and tuning indication means coupled to said amplifier for providing tuning information responsive to said amplified signal.

18 Claims, 3 Drawing Sheets

MUSICAL INSTRUMENT TUNER

FIELD OF THE INVENTION

The present invention relates to musical instrument tuners, more particularly to a tuner for providing tuning information regarding a musical instrument without making physical or electrical contact with the instrument.

BACKGROUND TO THE INVENTION

Musical instruments may have vibratory elements that vibrate at audio frequencies. The frequency of vibration of these vibratory elements is precisely adjusted to control the pitch of the musical instrument, a process hereinafter referred to as tuning. Commonly an electronic device is used to measure these frequencies and display appropriate information to the operator to facilitate the tuning process. This electronic device requires the audio frequency vibrations from the musical instrument to be converted to an electrical signal that is compatible with the device. Several methods have been used to achieve this including microphones, direct electrical connection to a musical instrument with built-in transducers and direct contact sensors such as piezo-electric materials or accelerometers. All of these methods have inherent limitations and undesirable characteristics which affect the ability to tune the musical instrument.

Microphones are sensitive to sound in the surroundings, which often makes it difficult or impossible to tune the musical instrument. Direct electrical connection is only possible for those musical instruments that include built-in transducers. Even when a direct electrical connection is present it can be inconvenient to use because the connection between the musical instrument and its sound-generating device must be broken to connect the electronic tuning device and then re-established after tuning is complete. Direct contact sensors must be in intimate physical contact with the musical instrument to sense its vibrations and often the reliability of the tuning process critically depends on the exact positioning of the sensors on the musical instrument. Moreover, such sensors often do not respond well to low frequencies and the intimate physical contact required can be undesirable when used with valuable musical instruments.

By using stroboscope techniques, where the vibratory element will appear motionless when the frequency of the strobe light corresponds with the frequency of vibration of the vibratory element, it is possible to circumvent the aforementioned inherent limitations. However this method requires an experienced operator and it does not work well on vibratory elements whose motion is difficult to observe by the human eye. Moreover, low-frequency strobe lights can cause discomfort for the operator.

Optical pick-ups for musical instruments have been described that must be mounted onto a musical instrument. U.S. Pat. No. 5,214,232 describes a musical instrument equipped with a detector optically detecting string vibrations. U.S. Pat. No. 4,815,353 describes a photoelectric transducer that is mounted onto a musical instrument. Neither document describes tuning the musical instrument.

Both of these documents require that the relative positioning of the detecting elements and the vibratory elements to be carefully controlled via predetermined geometry of the rigid body of the musical instrument. This requirement ensures the vibratory element remains within (what is described in U.S. Pat. No. 5,214,232 as) the linear zone, and that the magnitude of the measured signal is substantially proportional to the photo current in the detecting element. In addition, the electronic circuits of these documents require precise adjustment for each vibratory element being measured. Such inherent limitations preclude the use of these in a situation where the relative position of the photo emitting and photo detecting elements and the vibratory elements cannot be controlled, and where a variety of vibratory elements may be encountered.

Therefore a need exists for a device that can convert the frequency of vibrations of a vibratory element of a musical instrument to an electrical signal so that it can be sent to an electronic tuning device so that the musical instrument can be tuned without making physical or electrical contact with the vibratory element, or with the musical instrument which comprises said vibratory element, and which is insensitive to sound in the surroundings.

SUMMARY OF THE INVENTION

We will describe an optical pickup which can be positioned near to the vibratory elements of a musical instrument without making physical contact with said musical instrument.

According to an aspect of the present invention, there is provided a musical instrument tuner for providing tuning information for tuning a musical instrument, said musical instrument having a vibrating element, the tuner comprising: a light source for emitting light onto the said vibrating element; a light detector for detecting reflected light; an amplifier coupled to said light detector for amplifying a signal from said light detector; and tuning indication means coupled to said amplifier for providing tuning information responsive to said amplified signal.

In some preferred embodiments the light source is modulated and the tuner includes a system to preferentially detect the modulated light and to reject ambient light. In embodiments this system comprises a modulator coupled to modulate the light source, in which the modulator is also coupled to a demodulator for synchronous demodulation of the signal from the light detector. Preferred embodiments of the tuner thus comprise a phase locked loop (PLL).

The light source may comprise one or more light emitting diodes (LEDs); in preferred embodiments the light detector comprises at least one photodiode, for example a PIN photodiode, matched to the light source.

Surprisingly, it has been found that a tuner as described above, including a pickup comprising the light source and detector, works well for tuning both stringed instruments and instruments with a vibrating membrane, in particular drums. Optionally the focal length and/or angle of acceptance of the light detector can be adjusted experimentally to optimise the tuner for a particular use.

Preferred embodiments of the pickup system include a baffle for shielding the light detector from direct light from the light source, to thereby increase the signal-to-noise ratio of the detected light.

In embodiments the amplifier comprises a current to voltage converter for converting a current signal from the light detector to a voltage signal, and a voltage amplifier for increasing a magnitude of said voltage signal. Optionally the voltage amplifier may be configured to compensate for variations in an intensity of said reflected light. The tuner may include control means for controlling an intensity of the light source responsive to an intensity of the reflected light.

In some preferred embodiments the tuner further comprising a modulator coupled to the light source for modulating an intensity of the light source, a band pass filter coupled to the amplifier for filtering the amplified signal, a demodulator coupled to the band pass filter for demodulating the filtered signal, and a low pass filter coupled to the demodulator for filtering the demodulated signal, and wherein the tuning indication means is coupled to an output of the low pass filter. In preferred embodiments the modulator is coupled to the demodulator, for synchronous detection.

The tuning indication means may comprise, for example, a frequency counter coupled to a display, a frequency to voltage converter coupled to a meter, a phase-locked loop (PLL) with the difference voltage coupled to a meter, or a strobe display or strobe simulation. The display may comprise an LED display, for example displaying absolute pitch (e.g. Hz), relative pitch (e.g. flat or sharp) referred to a reference pitch, or an analogue meter such as a needle meter. Alternatively the tuning indication means may sample the amplified signal digitally, and use a Fast Fourier Transform (FFT) or Time Frequency Reassignment to determine the pitch.

According to another aspect of the present invention, there is provided a method of providing tuning information for tuning a musical instrument, the method comprising: emitting light onto a vibrating element of said musical instrument; detecting reflected light from said musical instrument; determining a frequency of intensity variations of said reflected light; and providing tuning information indication responsive to said determining.

According to a further aspect of the present invention, there is provided an optical tuner transducer, in particular for a musical instrument tuner as described above, for connecting to the tuner, the transducer comprising: a light source for emitting light onto the said vibrating element; a light detector for detecting reflected light; and a baffle for shielding said light detector from direct light from said light source.

Features of the above described aspects of the invention may be combined in any combination.

BRIEF DESCRIPTION OF THE DRAWINGS

These and other aspects of the invention will now be described in detail, with reference to the accompanying drawings, in which.

DETAILED DESCRIPTION OF PREFERRED EMBODIMENTS

Figure 1:
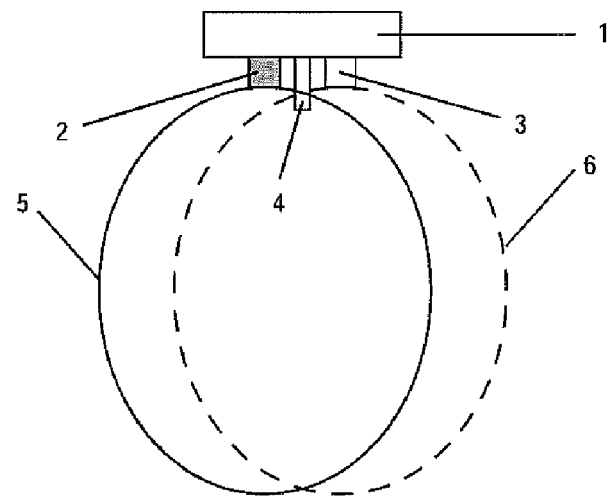
FIG. 1 is a view of the transducer showing a single photo emitting element and a single photo detecting element mounted to form the transducer according to the present invention.

Referring to FIG. 1, an embodiment of the present optical transducer which includes at least one photo emitting element 2 and at least one photo-detecting element 3 mounted onto a common object 1. An optional baffle 4 may be included to prevent light from the photo emitting element being detected by the photo detecting element without first undergoing reflection from an object. The region illuminated by light from the photo emitting element is shown by 5 and the region observed by the photo detecting element is shown by 6. The dimensions of these two regions must be such that when the optical transducer is placed nearby a vibratory element, said vibratory element can be illuminated by the photo emitting element and light reflected from said vibratory element can be detected by the photo detecting element.

Although FIG. 1 shows only a single photo-emitting element and a single photo detecting element, multiple photo emitting elements or photo detecting elements may be employed where the signals from these can be combined in such a way that the performance of the transducer is improved, for example to increase the spatial volume over which the transducer can detect vibrations or to make it less sensitive to the relative orientation of the vibratory element. Optionally a single detector output may be selected from many according to which detector output provides the best signal.

Figure 2A:
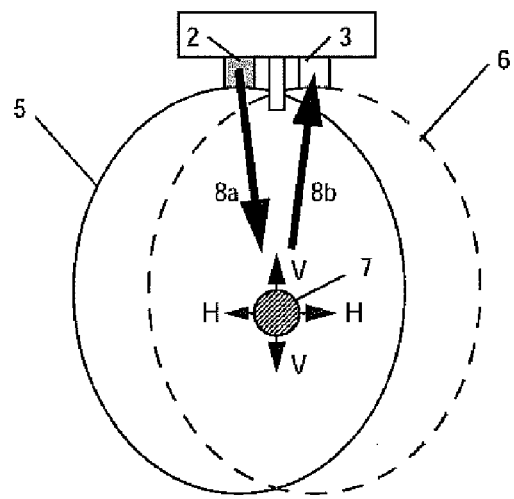
FIGS. 2A and 2B are different views showing how light from the light emitting element that is reflected from the vibratory element is detected by the photo detecting element with and without a substrate.

FIG. 2A, shows how the frequency of vibration of a vibratory element 7 can be detected by the optical transducer when said vibratory element is vibrating in different orientations. When the vibratory element is displaced, the change in the proportion of light reflected from the vibratory element and detected by the photo detecting element is determined by two processes: (a) reflectivity variation where the relative angle between the surface of the vibratory element and the illuminating light 8a and the path to the photo detecting element 8b is changed and (b) intensity variation where the intensity of light available to be reflected by the vibratory element is changed as the relative distance between the photo emitting element, the vibratory element and the photo detecting element is changed. When the vibratory element moves predominantly in the H direction the changes in the light detected by the photo detecting element are caused predominantly by reflectivity variation whereas when the vibratory element moves predominantly in the V direction the changes in the light detected by the photo detecting element are caused predominantly by intensity variation.

Figure 2B:
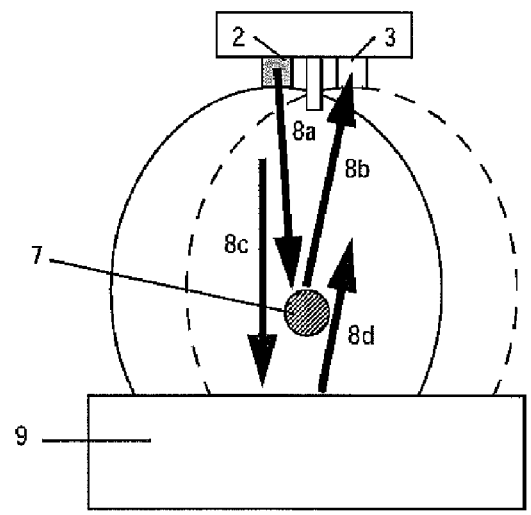

FIG. 2B shows the case where there may be a substrate 9 positioned beyond the vibratory element which is illuminated by the photo emitting element. In this situation, the presence of the substrate can enhance the detection of the frequency of vibration of the vibrating element. Light which illuminates the substrate as shown in ray 8c may be detected by the photo detecting element as shown by the ray 8d. Movement of the vibratory element will increase or decrease the amount of light present in ray 8d and this will be detected in combination with the light described in FIG. 2A shown by rays 8a and 8b.

Note that although FIG. 2A and FIG. 2B show a particular orientation of the optical transducer relative to the vibratory element, this is done for illustrative clarity and any relative orientation of each shall be suitable provided the vibratory element is illuminated by the photo emitting element and reflected light from said vibratory element is detected by the photo detecting element.

Figure 3:
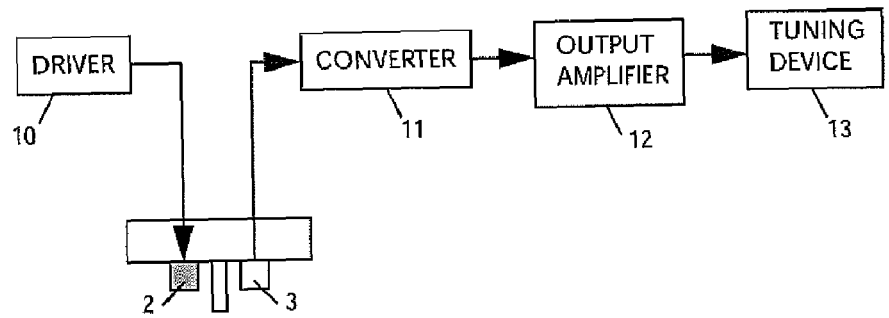
FIG. 3 is a block diagram of the basic electronic circuit according to the present invention.

The light detected by the photo detecting element as described herein shall be converted to an electrical signal so that this may be sent to the tuning device. FIG. 3 shows a block diagram of the basic electronic circuit which may be used to achieve this. A driver 10 is provided to supply power to the photo emitting element. A converter 11 is provided to convert the signal from the photo detecting element to a voltage which is related to the level of light being detected by the photo detecting element. An output amplifier 12 is provided to amplify the voltage obtained from the converter to a level suitable for the tuning device 13. The magnitude of this voltage will change when the transducer is repositioned relative to the vibrating element or when a vibrating element with different optical characteristics is measured. If the tuning device is not capable of operating with such changes in the magnitude of the voltage, the electronic circuit so far described may be modified to reduce the range of said changes.

Figure 4:
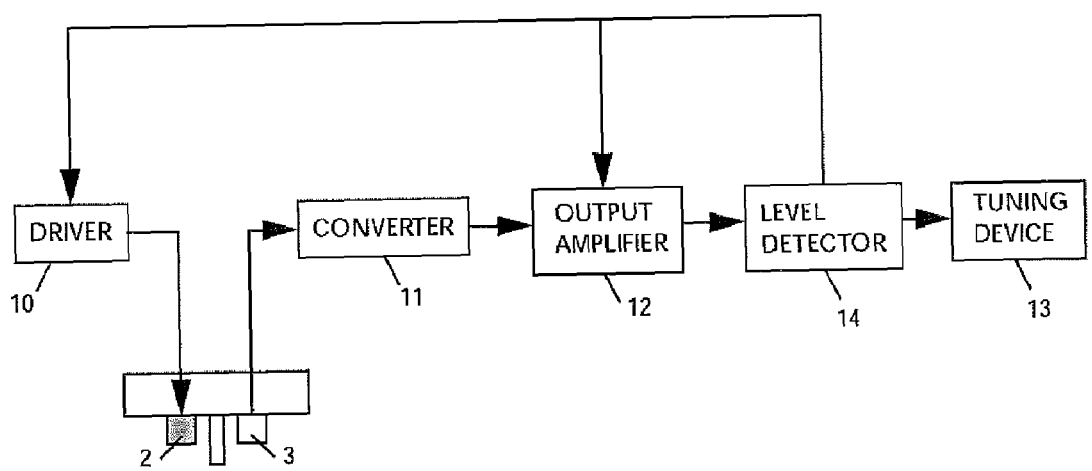
FIG. 4 is a block diagram of the improved basic electronic circuit according to the present invention.

Such a modified electronic circuit is shown in FIG. 4 where a level detector 14 has been added. By means of feedback, the level detector 14 may be used to control the amount of light illuminating the vibratory object by controlling the driver 10 and to control the gain of the output amplifier 12 such that the variations in the magnitude of the output voltage are reduced. One or both of the control methods thus far described shall be employed.

The reliability of the transducer can be affected by the presence of ambient light, including stationary and dynamic light sources. This can be reduced by using a photo emitting element and a photo detecting element that are less sensitive to such ambient light sources, such as those which operate at infra-red wavelengths. However, infra-red light is invisible and as such deprives the operator of a visual guide to the optimal placement of the transducer relative to the vibratory element. Therefore, it is preferable to use visible light and at the same time reduce the sensitivity of the transducer to ambient light.

Figure 5:
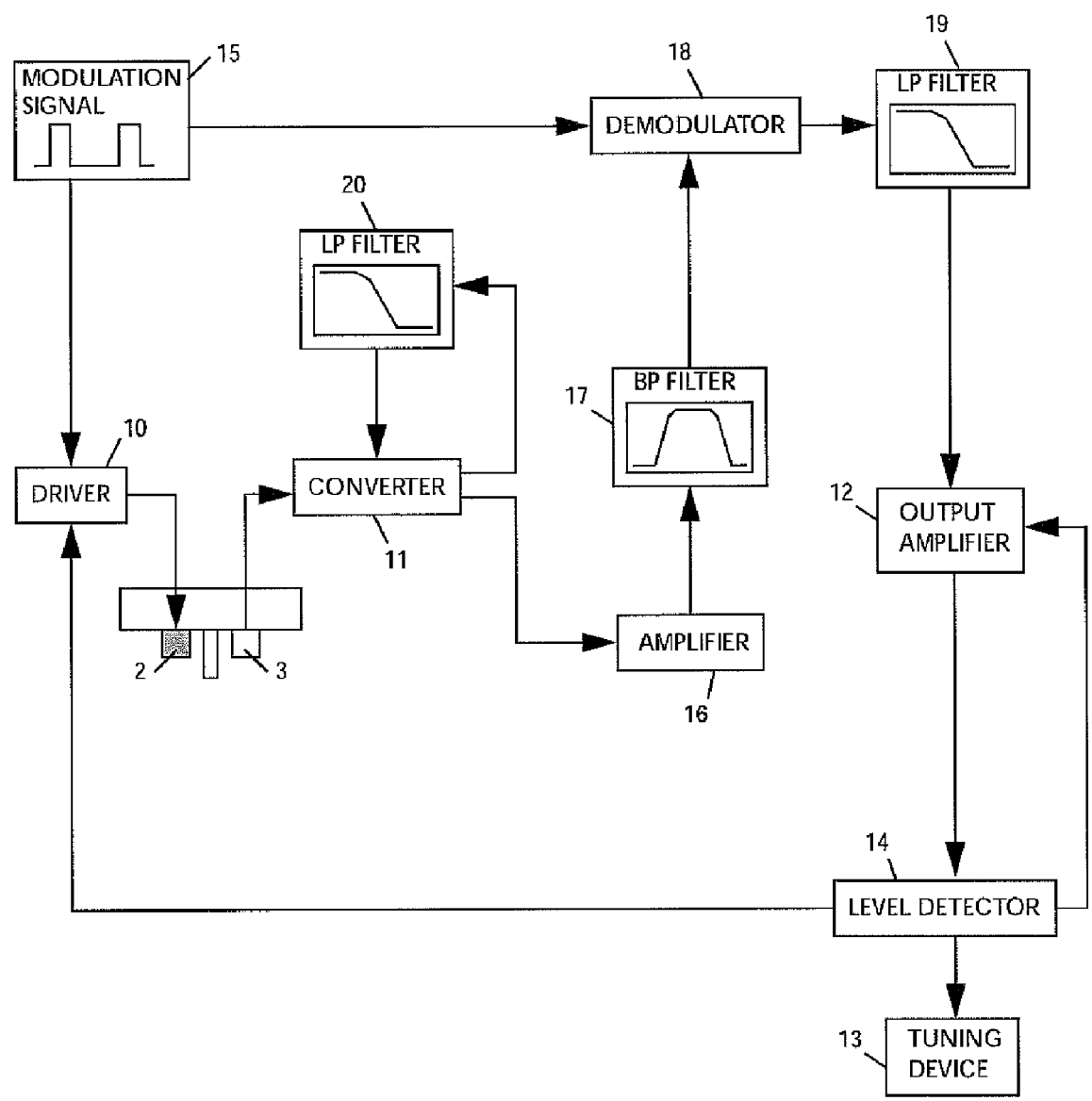
FIG. 5 is a block diagram of the advanced electronic circuit according to the present invention.

FIG. 5 shows a block diagram of the advanced electronic circuit to achieve these aims. The driver 10 for the light emitting element 2 is modulated by a modulating signal 15 such that the light illuminating the vibratory element is commensurately modulated. The signal from the converter 11 is filtered by a low-passing filter 20 and used by the converter 11 to compensate for ambient light with a low frequency of intensity variation. The signal from the converter 11 is also amplified by an amplifier 16 and filtered by a band-passing filter 17 to remove undesirable frequencies. The desired signal from the vibratory element is recovered by a demodulator 18 and a low-passing filter 19. Preferably the modulator 15 is coupled to the demodulator 18, to effectively form a phase locked loop. The remainder of this electronic circuit is as described in FIG. 4.

In summary, we have described an optical transducer for use with a variety of musical instruments which can convert the vibrating motion of vibratory elements to an electrical signal suitable for tuning said musical instrument with a secondary tuning device, whilst overcoming the deficiencies in previously developed non-contact transducers.

No doubt many other effective alternatives will occur to the skilled person. Whereas the present invention has been described with respect to specific embodiments thereof, it will be understood that the invention is not limited to the described embodiments and encompasses modifications apparent to those skilled in the art lying within the spirit and scope of the claims appended hereto.

I claim:

1. A non-contact drum tuner for providing tuning information for tuning a drum without making physical contact with said drum, said drum having a vibrating membrane, the tuner comprising:
   a light source for emitting modulated light onto the said vibrating membrane;
   a modulator to modulate said light source;
   a light detector for detecting reflected light, wherein said light detector receives a combination of reflected said emitted modulated light and ambient light;
   an ambient light rejection system coupled to said light detector to preferentially detect said emitted modulated light and to reject said ambient light;
   an amplifier coupled to said ambient light rejection system for amplifying a signal from said ambient light rejection system;
   tuning indication means coupled to said amplifier for providing tuning information responsive to said amplified signal; and
   wherein said ambient light rejection system comprises a demodulator coupled to receive a signal from said amplifier and a detector coupled to an output of said demodulator and having an output coupled to said tuning indication means.

2. A non-contact drum tuner according to claim 1, wherein said light source comprises a plurality of light emitter elements for illuminating the same said vibrating membrane for increasing a spatial volume over which reflected light is detected from said vibrating membrane, in use, by said light detector.

3. A non-contact drum tuner according to claim 1, wherein said light detector comprises a plurality of light detector elements for detecting reflected light from the same said vibrating membrane over a greater range of orientations of the said vibrating membrane.

4. A non-contact drum tuner according to claim 1, wherein said amplifier comprises a current to voltage converter for converting a current signal from said light detector to a voltage signal, and a voltage amplifier for increasing a magnitude of said voltage signal.

5. A non-contact drum tuner according to claim 4, wherein said voltage amplifier is configured to compensate for variations in an intensity of said detected light comprising said combination of reflected said emitted modulated light and said ambient light.

6. A non-contact drum tuner according to claim 1, further comprising a baffle for shielding said light detector from direct light from said light source.

7. A non-contact drum tuner according to claim 1, wherein said light source comprises a visible light source.

8. A non-contact drum tuner according to claim 1, further comprising control means for controlling an intensity of said light source responsive to an intensity of said detected light comprising said combination of reflected said emitted modulated light and said ambient light.

9. A non-contact drum tuner according to claim 1, further comprising a modulator coupled to said light source for modulating an intensity of said light source, a band pass filter coupled to said amplifier for filtering said amplified signal, a demodulator coupled to said band pass filter for demodulating said filtered signal, and a low pass filter coupled to said demodulator for filtering said demodulated signal, and wherein said tuning indication means is coupled to an output of said low pass filter.

10. A non-contact drum tuner according to claim 9 wherein said modulator is coupled to said demodulator.

11. A stringed instrument tuner for providing tuning information for tuning a stringed instrument without making physical contact with said stringed instrument, said stringed instrument having a vibrating string, the tuner comprising:
   a light source for emitting modulated light onto the said vibrating string;
   a modulator to modulate said light source;
   a light detector for detecting reflected light, wherein said light detector receives a combination of reflected said emitted modulated light and ambient light;
   an ambient light rejection system coupled to said light detector to preferentially detect said emitted modulated light and to reject said ambient light;

an amplifier coupled to said ambient light rejection system for amplifying a signal from said ambient light rejection system;

tuning indication means coupled to said amplifier for providing tuning information responsive to said amplified signal;

wherein said ambient light rejection system comprises a demodulator coupled to receive a signal from said amplifier and a detector coupled to an output of said demodulator and having an output coupled to said tuning indication means.

12. A non-contact stringed instrument tuner according to claim 11, wherein said light source comprises a plurality of light emitter elements for illuminating the same said vibrating string for increasing a spatial volume over which reflected light is detected from said vibrating string, in use, by said light detector.

13. A non-contact stringed instrument tuner according to claim 11, wherein said amplifier comprises a current to voltage converter for converting a current signal from said light detector to a voltage signal, and a voltage amplifier for increasing a magnitude of said voltage signal and voltage amplifier is configured to compensate for variations in an intensity of said detected light comprising said combination of reflected said emitted modulated light and said ambient light.

14. A non-contact stringed instrument tuner according to claim 11, further comprising control means for controlling an intensity of said light source responsive to an intensity of said detected light comprising said combination of reflected said emitted modulated light and said ambient light.

15. A non-contact musical instrument tuner for providing tuning information for tuning a musical instrument without making physical contact with said musical instrument, said musical instrument having a vibrating element, the tuner comprising:

a light source for emitting modulated light onto the said vibrating element;

a modulator to modulate said light source;

a light detector for detecting reflected light, wherein said light detector receives a combination of reflected said emitted modulated light and ambient light;

an ambient light rejection system coupled to said light detector to preferentially detect said emitted modulated light and to reject said ambient light;

an amplifier coupled to said ambient light rejection system for amplifying a signal from said ambient light rejection system;

tuning indication means coupled to said amplifier for providing tuning information responsive to said amplified signal;

wherein said ambient light rejection system comprises a demodulator coupled to receive a signal from said amplifier and a detector coupled to an output of said demodulator and having an output coupled to said tuning indication means.

16. A non-contact musical instrument tuner according to claim 15, wherein said light source comprises a plurality of light emitter elements for illuminating the same said vibrating element for increasing a spatial volume over which reflected light is detected from said vibrating element, in use, by said light detector.

17. A non-contact musical instrument tuner according to claim 15, wherein said amplifier comprises a current to voltage converter for converting a current signal from said light detector to a voltage signal, and a voltage amplifier for increasing a magnitude of said voltage signal and said voltage amplifier is configured to compensate for variations in an intensity of said detected light comprising said combination of reflected said emitted modulated light and said ambient light.

18. A non-contact musical instrument tuner according to claim 15, further comprising control means for controlling an intensity of said light source responsive to an intensity of said detected light comprising said combination of reflected said emitted modulated light and said ambient light.

* * * * *